Aug. 30, 1949.  F. W. STRASSHEIM  2,480,518
FILTER
Filed April 7, 1945  6 Sheets-Sheet 2
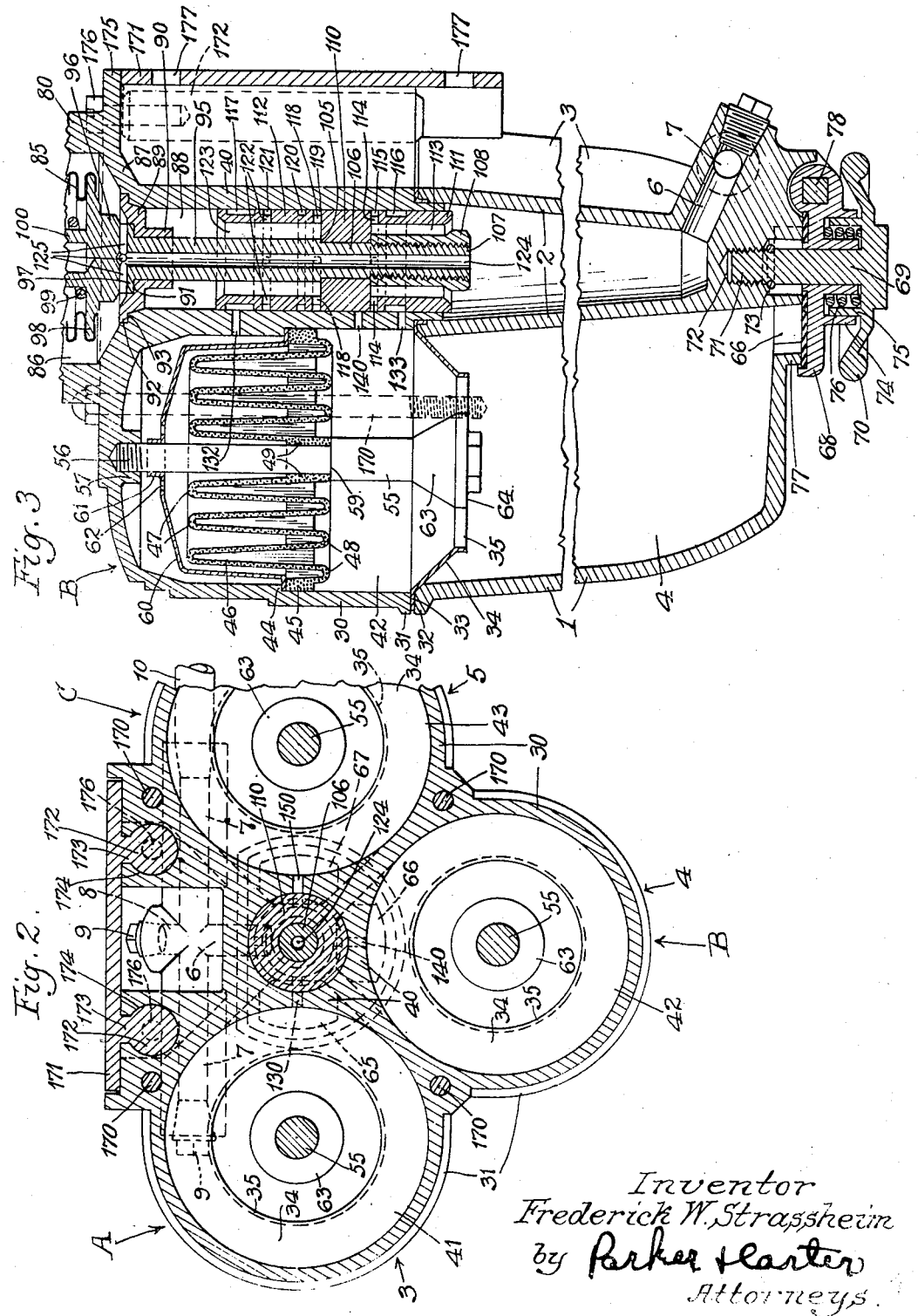
Inventor
Frederick W. Strassheim
by Parker & Carter
Attorneys.

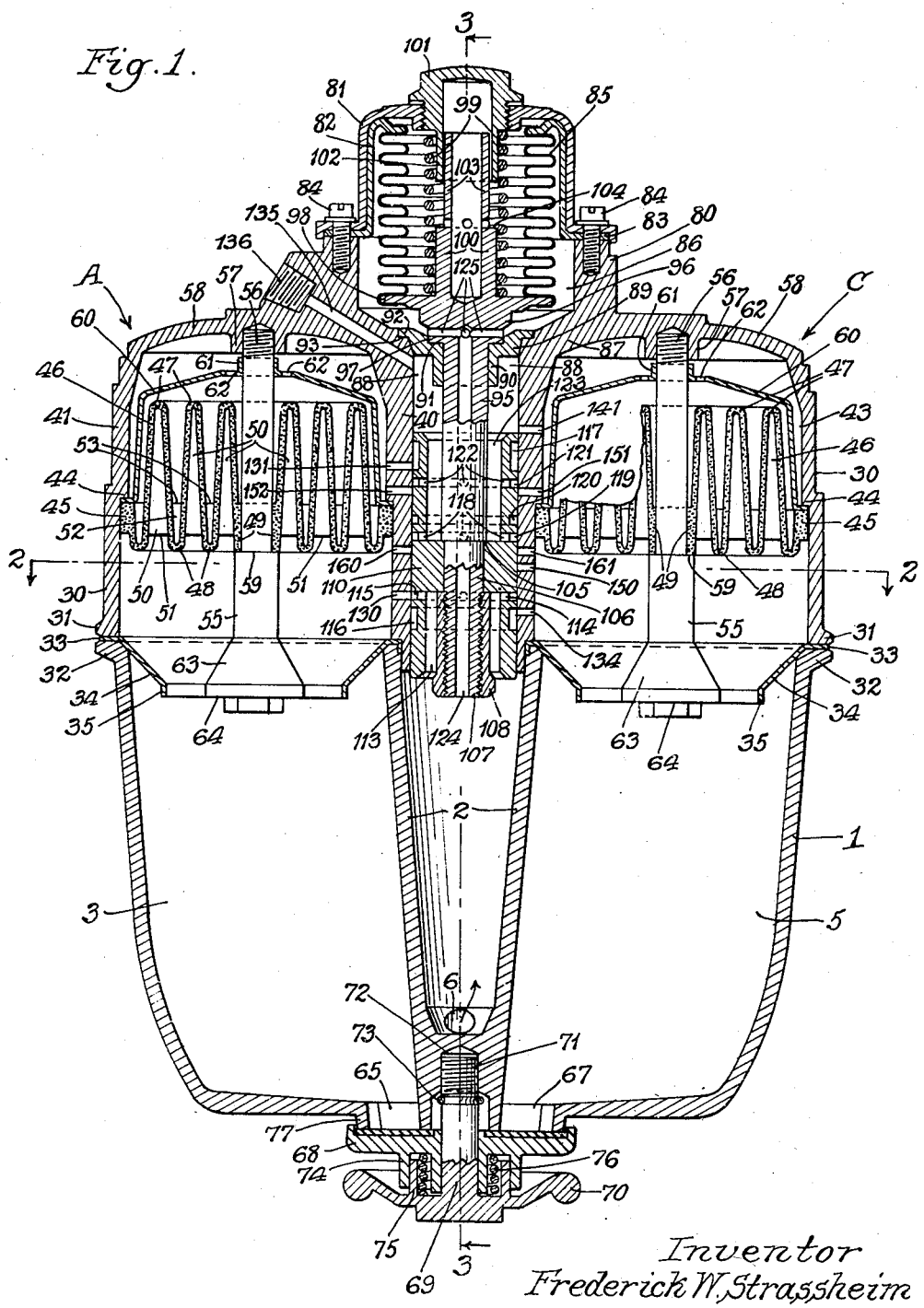

Aug. 30, 1949.     F. W. STRASSHEIM     2,480,518
FILTER
Filed April 7, 1945     6 Sheets-Sheet 3

Inventor
Frederick W. Strassheim
by Parker & Carter
Attorneys.

Aug. 30, 1949.  F. W. STRASSHEIM  2,480,518
FILTER
Filed April 7, 1945  6 Sheets-Sheet 4

Inventor
Frederick W. Strassheim
by Parker Harter
Attorneys.

Aug. 30, 1949.    F. W. STRASSHEIM    2,480,518
FILTER

Filed April 7, 1945    6 Sheets-Sheet 5

Inventor
Frederick W. Strassheim
by Parker & Carter
Attorneys.

Aug. 30, 1949.  F. W. STRASSHEIM  2,480,518
FILTER
Filed April 7, 1945  6 Sheets-Sheet 6
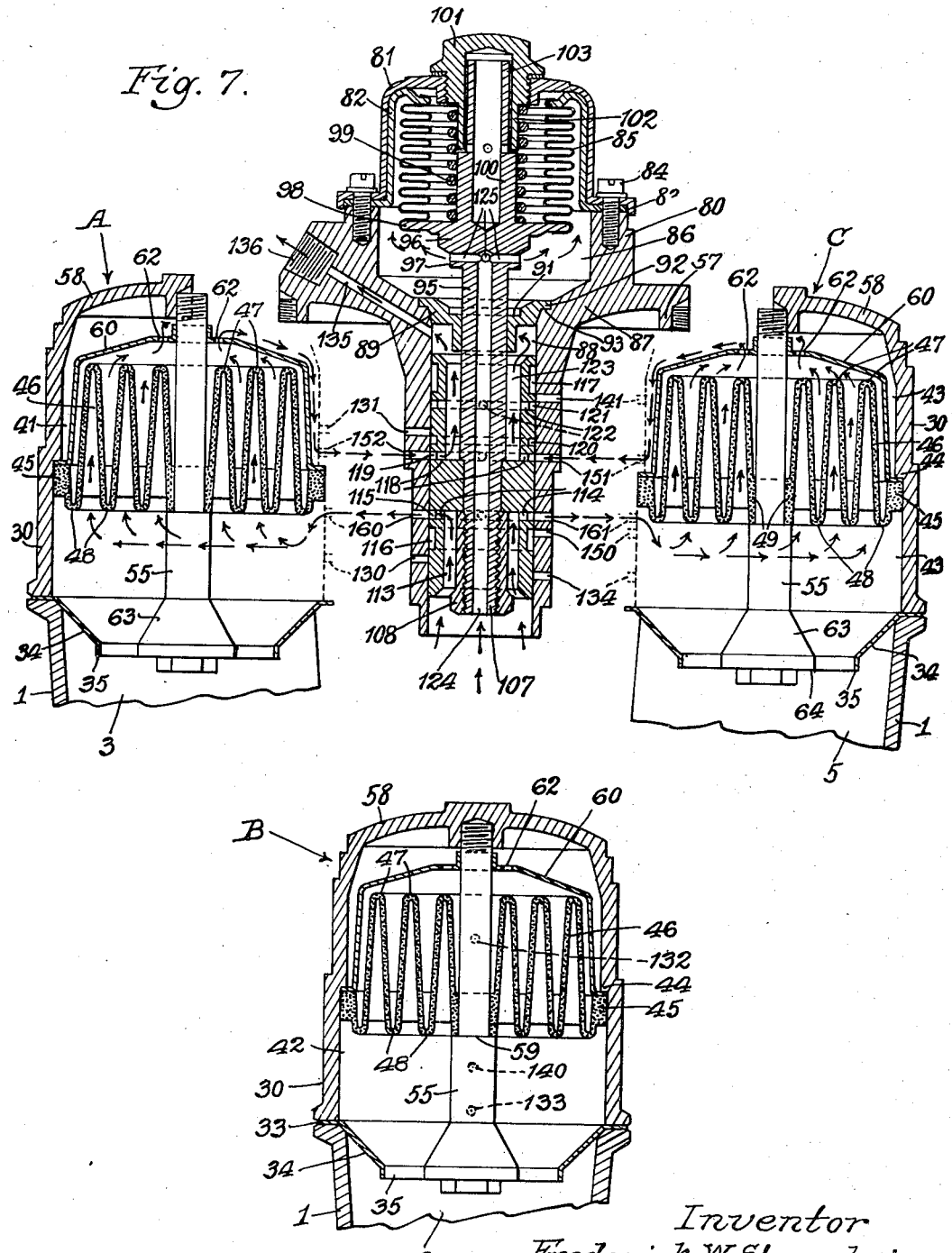
Inventor
Frederick W. Strassheim
by Parker & Carter
Attorneys.

Patented Aug. 30, 1949

2,480,518

UNITED STATES PATENT OFFICE 2,480,518

FILTER

Frederick W. Strassheim, Chicago, Ill.

Application April 7, 1945, Serial No. 587,079

13 Claims. (Cl. 210—167)

My invention relates to an improvement in filters. It has for one purpose to provide a filter for use, in closed circuit, with lubricants, such as the lubricating oil circuit used in internal combustion motors.

Another purpose is to provide a filter through which a stream of a liquid to be filtered may pass and in which a plurality of individual filtering elements are employed which in the aggregate prevent any damaging passage of impurities through or from the filter assembly.

Another purpose is to provide an improved filter assembly in which a plurality of identical replaceable and exchangeable filter elements are employed.

Another purpose is to provide an improved housing for a filter assembly.

Another purpose is to provide improved means for changing the direction of flow of a liquid undergoing filtering through the individual filter elements of a filter assembly.

Another purpose is to provide a filter assembly in which the individual filter elements are cleaned by changes in the direction of flow of the liquid undergoing filtering through the individual filter elements.

Another purpose is to provide a filtering assembly in which the filtering elements are cleaned in response to changes of the rate of flow of the liquid undergoing filtering through the filtering assembly.

Another purpose is to provide an improved filtering assembly in which a valve assembly is employed to change the direction of flow of the liquid through individual filter elements.

Another purpose is to provide a filter assembly including means for changing the order of flow of the liquid through a group of individual filter elements.

Another purpose is to provide an improved filter element.

Another purpose is to provide improved means for withdrawing sludge from a filter assembly.

Other purposes will appear from time to time in the course of the specification and claims.

The invention is illustrated more or less diagrammatically in the accompanying drawings wherein:

Figure 1 is a vertical section;

Figure 2 is a section on the line 2—2 of Figure 1;

Figure 3 is a section on the line 3—3 of Figure 1;

Figure 7 is a similar partially diagrammatic illustration of the path and direction of flow of oil at engine speeds corresponding to speeds above 15 miles per hour.

Like parts are indicated by like symbols through the specification and drawings.

Figure 4:
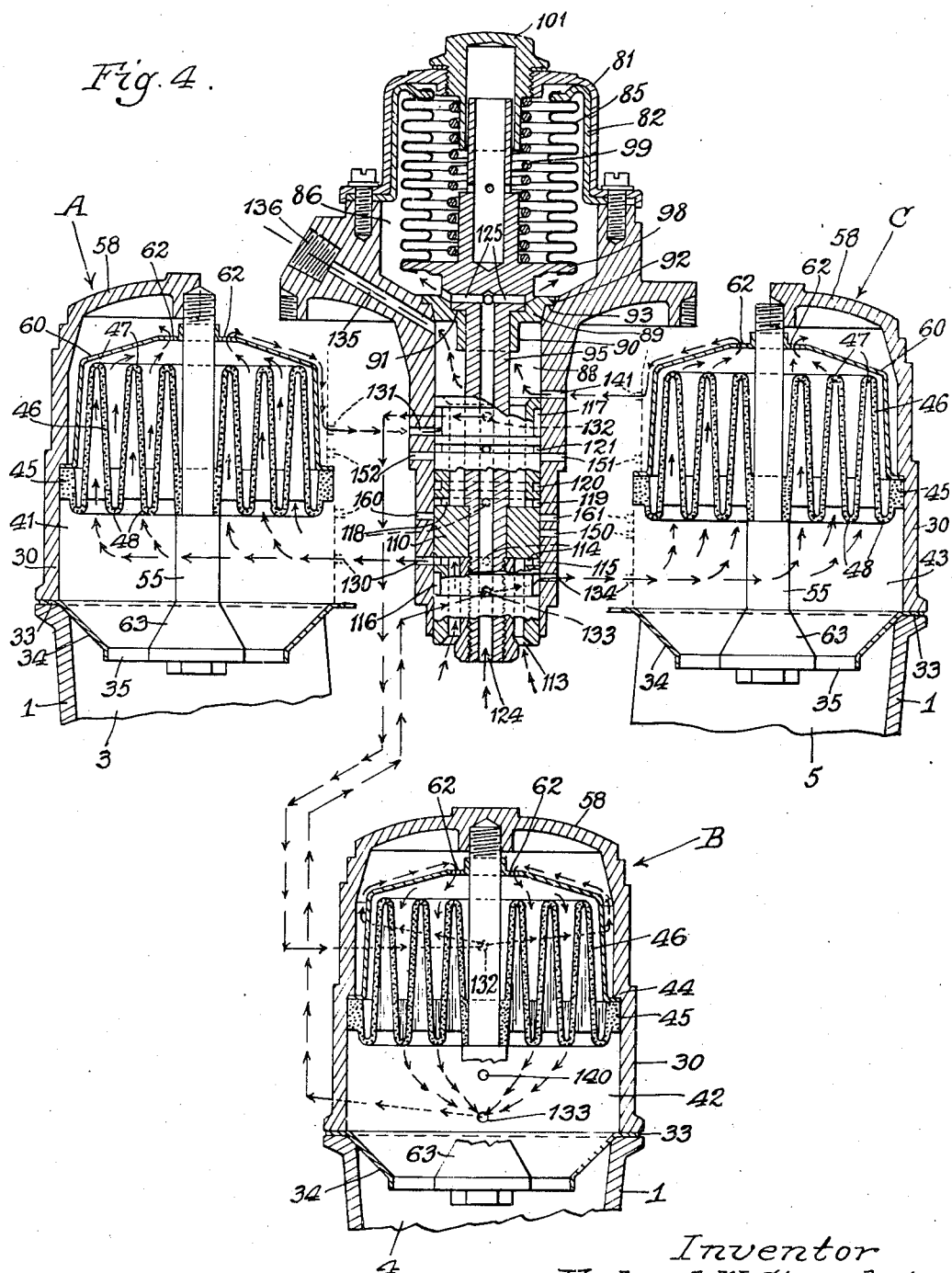
Figure 4 is a partly diagrammatic illustration of the path and direction of flow of oil when the engine is either idling or running at a speed corresponding to five miles per hour or less.

My invention is shown as embodied in an oil filter adapted for use with an internal combustion engine such as a motor used with an automobile. It will be understood, however, that my invention may be applied to a wide variety of problems and its application to an internal combustion motor is intended to illustrate and not to restrict the invention. The engine speeds or oil pressures at which changes in the path of flow of the oil take place can be widely varied, and the above grouping by speeds is merely illustrative.

Referring to the drawings, and particularly to Figures 1 and 2, I illustrate a filter assembly which includes a lower housing portion 1 and an upper housing portion 30. The lower housing portion includes a central sleeve 2. Surrounding it are three sump wall portions numbered respectively 3, 4 and 5. These wall portions define a sump space or spaces about the central duct portion 2. 6 is an inlet passage for the liquid to be filtered. It forms one branch of a cruciform passage having the transverse portion 7 and the cross portion 8, the latter being aligned with the inlet 6. Thus three possible connecting points for the oil delivery duct are provided, of which in Figure 2, two are closed by plugs 9.

10 is any suitable oil delivery pipe through which the oil to be filtered passes through the ducts 7 and 6 to the bore of the sleeve 2.

The upper housing portion 30 has a circumferential edge with a lower edge or lip 31 opposed to the corresponding upper lip or face 32 of the lower member 1. I may employ a single gasket 33 of copper or any other suitable material, compressed between the portions 31 and 32. It is shown as being formed with funnels 34 bounded by reinforcing or stiffening cylindrical sleeves 35. It will be understood that there is a separate funnel for each of the sludge chambers defined by the walls 3, 4 and 5.

The upper housing 30 includes an integrally formed cylindrical valve sleeve 40 provided with a plurality of ports which will later be identified in detail. Preferably unitary with the sleeve 40 are the filter housings 41, 42 and 43, which are aligned respectively with the sludge chambers 3, 4 and 5. Each such filter housing has a downwardly faced ledge or step 44 against which the below described filter members may be upwardly thrust. The three filter members for the three filter housings may be identical. Each filter member may include a plurality of circumferentially extending bends formed of relatively thin filter material. Referring for example to Figure 1, I illustrate a circumferential reinforcing ring or edge ring 45 within which the relatively thin filter body 46 is located. The filter body may be formed of relatively thin fine pored filter material. I may for example, employ a material built up, formed or molded of powdered metal. It will be understood, however, that I do not wish to limit myself to any specific material, since a wide variety of materials may be used. The member 46 is shown as formed of a series of circumferential folds having upper bends 47 and lower bends 48. The innermost fold terminates in an inner sleeve 49 which may lie in the same horizontal plane as the outer ring 45. It may be desirable, in order to provide a firm and self-sustaining filter member which is still of sufficient thinness, to employ reinforcing means. I illustrate for example integral generally radial connecting bridges 50 in the lower bends, each such bridge terminating in a lower surface 51. In order to maintain a maximum filtering surface, I may omit the use of bridges in the upper bends but I find it advantageous to employ a small bridge portion 52, terminating in an upper surface 53. Preferably the bridges 50 and 52 are aligned along radii of the filter member. In effect, therefore, the inner sleeve 49 and the circumferential ring 45 are connected by a plurality of radially extending bridges. These reinforcing bridges may conveniently be made unitary with the filter member as a whole, although it is also possible to form them of different material or to add them to the filter element after it is completed. It is convenient and efficient, however, to mold or form a unitary filter member in which all of the above parts are formed at the same time and of the same material.

The filter members may conveniently be locked in position by the employment of a supporting and locking pin 55, each such pin being screw threaded at its upper end 56 whereby it may be screwed into the threads of a boss or downwardly extending sleeve 57, in the roof portion 58 of the filter housings 41, 42 or 43. The pin 55 is shouldered as at 59 to engage the lower edge of the central ring or sleeve 49 of the filter element. It is thus effective to hold the outer ring 45 of the filter element upwardly against the shoulder 44. However, I find it advantageous to interpose between the ring 45 and the shoulder 44 the outer edge of a flow controlling dome 60 which has a central sleeve 61 surrounding an upper portion of the pin 55 and is provided with apertures 62, whereby the flow of oil to or from the filter element is directed and distributed to the upper surface of the filter element. I also find it advantageous to flare the bottom of the pin 55 as at 63. Its lower edge 64 defines with the sleeve 35 of one of the downwardly conic portions of the gasket 33 a circumferential slot or zone of escape for the sludge from the filter member which lies above it. This sludge which gathers in the sludge chambers 3, 4 or 5 can be withdrawn from bottom outlets 65, 66 and 67, all three of which may be controlled by the single removable closure 68. This closure may be locked in position by the control element 69 having a manually engageable wheel like handle 70 and the screw portion 71 penetrating an appropriately threaded aperture 72 in the lower end of the sleeve 2.

When the member 69 is rotated to the release position, the closure 68 is confined on it by any suitable means such as the snap ring 73. The members 68 and 69 have interpenetrating or telescopic cylindrical portions 74, 75 which define a closure within which is located the coil spring 76. The spring 76 is effective to prevent disengagement of the cap or closure 68 from the opposed lip 77 until the threads 71 are completely released and the closure is then removed as a unit. For convenience the closure or cap 68 may be hinged to the bottom of the lower housing 1 as at 78.

It will be understood that the oil may flow through the filter units in different order depending upon changes in the oil pressure, caused, for example, by changes in the speed of an engine. For convenience, I indicate the three separate filter elements and their associated parts as A, B and C. I will now describe the means for varying or controlling the path of movement of the oil through the filter assembly including the three elements A, B and C.

80 indicates a circumferential sleeve or flange upwardly extending from the cover portion 58 of the upper housing element 30. 81 is a dome or upwardly extending closure therefor. Within and conforming generally to the interior of the dome is a gasket 82, the outer flange 83 of which is confined between the opposed edges of the dome and the flanges 80, the parts being held securely together by locking screws 84. The gasket 82 has secured to its inner edge in oil tight relationship the upper end of the bellows 85 which may be of thin material such as sheet copper. Surrounded by the flange 80 and the gasket 82 is a pressure chamber 86 the bottom of which is closed by the portion 87 of the top of the casting 30. This space receives oil, under varying pressures, depending upon changes in the rate of speed of the motor or engine with which the filter is used. This chamber 86 is downwardly continued by the valve chamber generally indicated at 88 which is bounded by the cylindrical inner wall of the sleeve 40. Adjacent the point of connection between the chambers 86 and 88 is positioned a guiding element 89 having a central sleeve 90 with a cylindrical interior. The guiding element has an upper ledge 91, the purpose of which will later appear. It is upwardly extended as at 92 to seat upon any suitable ledge or shelf 93 which constitutes an outward expansion of the inner surface of the sleeve 40. In the position of the parts in Figure 3 the member 89 is shown as seated. It will normally be maintained in the seated position but it can readily be upwardly removed when the device is demounted. Slidable in the sleeve 90 is the valve controlling stem 95 which is outwardly expanded as at 96 and includes a ledge portion 97 adapted to rest upon the shelf 91. It is further expanded as at 98, the latter expanded portion being secured in oil tight relationship to the lower end of the bellows 85. The parts are normally held in the position in which they are shown in Figure 3 by the thrust of the compressed coil spring 99 which is centered by an upward extension 100 of the valve stem 95. 101 is a closure cap which extends downwardly through the top of the dome 81. For convenience, it is provided with a downwardly extending flange 102 which surrounds an upper portion 103 of the sleeve 100, which is of reduced diameter. Thus the lower edge of the sleeve 102 serves as a stop against which the upper portion of the sleeve 100 as at 104, can abut. The valve operating stem 95 is downwardly shouldered at its lower end as at 105 and has a lower portion 106 of reduced diameter and below that a screw threaded portion 107. A ported valve cylinder 110 is upwardly held against the ledge 105 for example by the elongated lock nut 108, the upper edge of which abuts against the intermediate portion of the valve cylinder 110. The central portion of the valve cylinder has a downwardly extending skirt 111 and an upwardly extending skirt 112. The downwardly extending skirt is separated from the exterior of the lock nut 108 as at 113 to provide a circumferentially extending annular oil inlet passage. 114 indicate ports extending outwardly from the upper end of the space 113 into communication with the outside channel 115. 116 is another outside channel formed in the exterior of the skirt 111 somewhat below the channel 115. The upper skirt 112 is separated by a space 117 from the opposed wall of the valve operating stem 95. A bottom group of radial ports 118 extend to an exterior circumferential channel 119. 120 indicates an intermediate circumferential channel. 121 is a higher circumferential channel connected with the interior valve spaced by radial ports 122. 123 is an upper circumferential channel unconnected with the interior of the sleeve and of substantially greater vertical extension than the channels next below it. The valve operating stem 95 is provided with a central longitudinal duct 124 which extends to the member 96 and is there connected by radially extending ports 125 with the interior of the passage exterior to the bellows 85. Thus the admission of oil under pressure upwardly along the duct 124 subjects the bellows 85 to pressure and tends to collapse the bellows against the thrust of the spring 99 and to change the position of the valve cylinder 110 in relation to the sleeve 40 in which it is positioned. This changes the relationship between the various ducts as will now be described in detail.

The sleeve or central body portion 40 which surrounds the space in which the valve piston 110 travels is ported to provide communication with the individual filter units A, B and C. It will be understood that the oil which flows inwardly through the inlet 6 when the engine is idling is controlled by the position of the valve cylinder 110 indicated in Figures 1 and 4. Oil will therefore pass upwardly through the circumferential passage 113 and outwardly through the ducts 114 through the circumferential passage 115 which at the position of Figures 1 and 4 is aligned with a port 130. The oil then passes upwardly through the filter unit 46 in the chamber A outwardly through the opening 62 of the hood 60 and thence back through the port 131 to the circumferential passage 117. From the circumferential passage 117 it passes through the port 132 which, as shown in the dotted lines of Figure 4, delivers the oil to the upper chamber of the unit B, above the deflector 60. It passes thence downwardly through the aperture 62 to the top of the filter element 46 of the unit B. After passing downwardly through the filter element of the unit B it escapes through the port 133 through which it passes to the circumferential valve channel 116. Thence it passes through the duct 134 to the lower side of the filter member of the unit C. The oil passes upwardly through the filter 46 of the unit C, through the apertures 62 of its deflector or hood 60 and thence through a port 141 which is in communication with the cylindrical space 88 surrounded by the sleeve 40. Thence it escapes to the outlet passage 135 through any suitable pipe connection aperture 136. Thus in the initial position of Figures 1 and 4, when the engine is idling or running at a very low speed the oil passes upwardly through the unit A, downwardly through the unit B and upwardly through the unit C.

The initial impurities will be deposited on the bottom of the filter element in the unit A. Such impurities as are already on the filter element in the unit B will be discharged as sludge, unit B being cleaned and the remaining impurities if any, which will practically be nonexistent, will be deposited on the lower face of the unit C.

Figure 5:
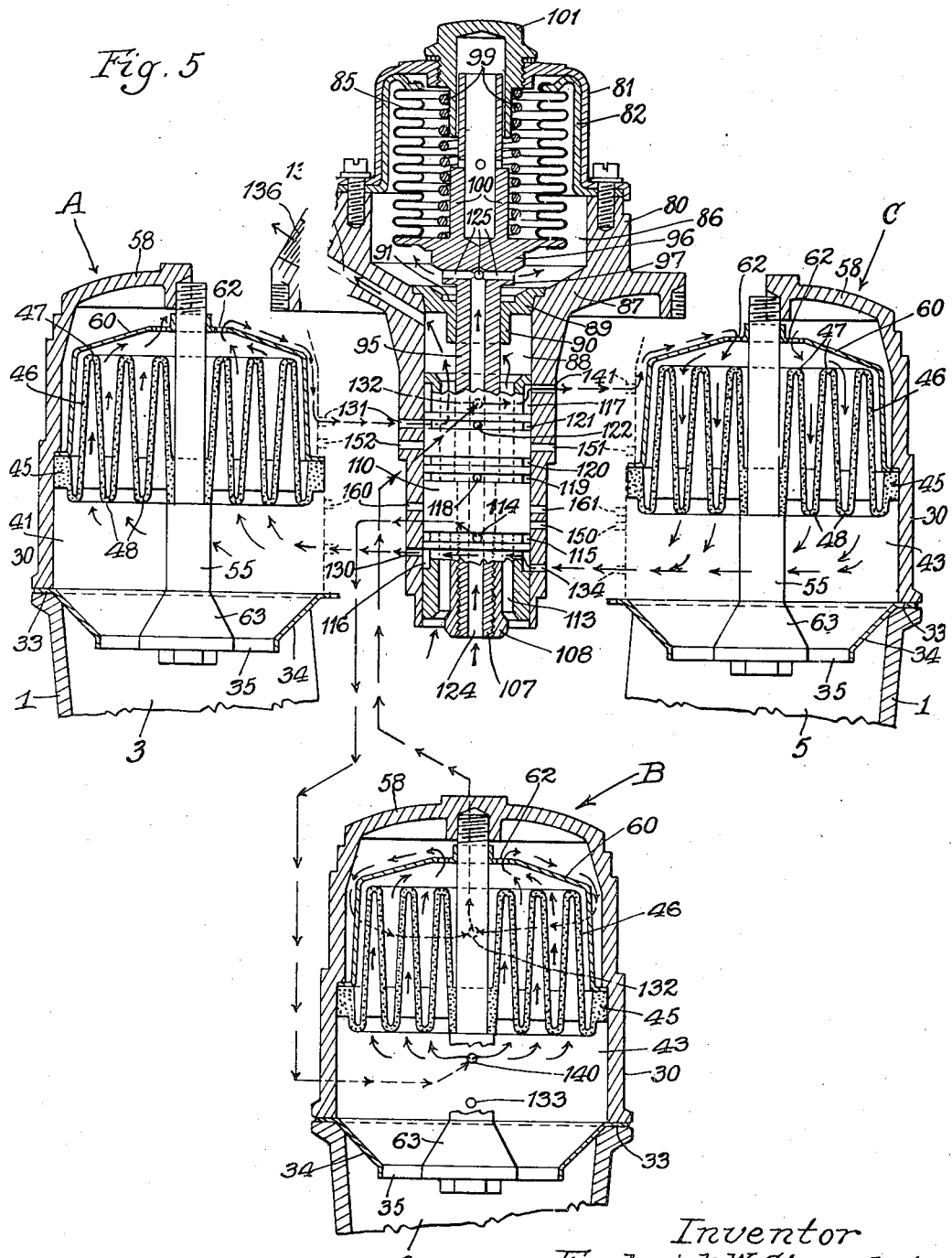
Figure 5 is a similar partly diagrammatic illustration of the path and direction of flow of the oil at a somewhat higher rate of engine speed, such as from 5 to 10 miles per hour.

Assume that the speed increases to the secondary range which may for example be from five to ten miles an hour, the contraction of the bellows 85 and the spring 99 caused by the increased oil flow, will result in a raising of the valve structure to the position in which it is shown in Figure 5. The oil will be delivered, as before, through the inlet 6 and will flow through the port 140 to the lower side of the unit B. It will flow through the filter unit in B, and out through the apertures 62 of the hood 60 out through the duct 132, thence through the circumferential passage 117 and the duct 141 to the top side of the filter element of the unit C. It then flows downwardly through the apertures 62, downwardly through the filter element in C, and out through the duct 134 to the passage 116. It flows thence through the duct 130 to the underside of the unit A, back through the duct 131 to the circumferential passage 121 and ducts 122 and thence upwardly through the passage 123 in the valve structure and out through the discharge passage 135. Thus at this second stage the oil goes upwardly through the previously cleaned element B then downwardly through the element C, cleaning it, and then upwardly through the element A and thence back to the engine.

Figure 6:
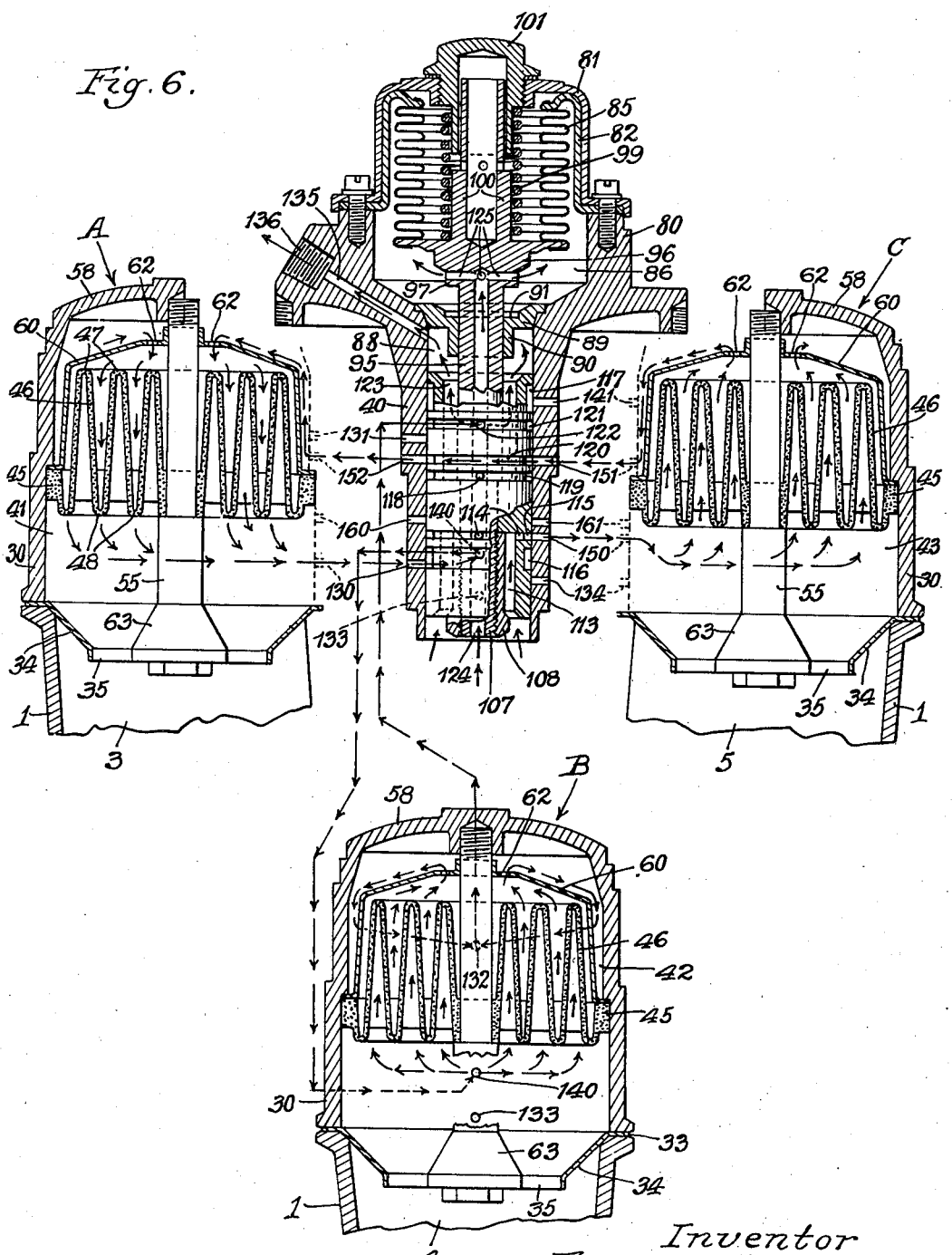
Figure 6 is a similar illustration of the path and direction of flow of the oil at engine speeds of from 10 to 15 miles per hour.

After an additional increase of speed the further compression of the bellows 85 and the spring 99, by the increasing oil pressure, further raises the valve cylinder 110 to the position in which it is shown in Figure 6. The oil then initially flows through the passages 113, 114 and 115 to the port 150, through which it flows to the underside of the filter element of the unit C. It flows thence through the passages 62 and the port 151 back through the valve cylinder 110 outwardly through the port 152 to the top side of the filter unit A. It flows through the apertures 62 downwardly through the filter element of A, and outwardly through the port 130, into the circumferential passage 116, thence through the port 140 upwardly through the filter element of the unit B, thence outwardly through the port 132 and back to the discharge outlet duct 135. Thus at the third position the initial flow is upwardly through the already cleaned unit C, downwardly through the unit A, to clean it, and upwardly through the previously cleaned unit B and thence back to the engine.

When the engine reaches a still higher speed, which may normally be the speed of usual vehicle operation, the spring 99 and the bellows 85 are further compressed and the valve cylinder 110 is further raised to the fourth position, as shown in Figure 7. At that final position the oil flows outwardly through the passages 113, 114 and 115, and outwardly simultaneously through the ports 160 and 161. From 160 the oil passes upwardly through the already cleaned filter element of A charge passage 135. At the same time oil flowing through the duct 161 passes through the lower side of the already cleaned unit in C, outwardly through the passage 62 and back through the port 151. Thence it flows back through the passage 119 and the ports 118 to the passage 123 in and out through the passage 135.

In the general assembly and mounting of the above described device the upper casing portion 30 and the lower casing portion 1 are connected by any suitable securing members such as the bolts 170, which also center the gasket in which the various sump funnels 34 are formed. The lower ends of the bolts 170 are screw threaded to penetrate an upper part of the lower casing 1.

The unit as a whole may be supported in any suitable way. I illustrate however a bracket including a base plate 171 having partly cylindrical guide and supporting members 172 positioned thereon by connecting portions 173. These are received in correspondingly formed pockets or apertures 174 in the upper casing 30. The upper casing also includes a top wall portion 175 which is adapted to rest upon or cover the upper ends of the members 172 and the upper edge of the bracket base 171. Any suitable securing screws 176 may also be employed, and the bracket base 171 may be provided with apertures 177 adapted to receive screws or other supporting means whereby the bracket may be mounted on any suitable supporting surface.

The use and operation of my invention are as follows:

I have illustrated in Figures 4, 5, 6 and 7 four valve positions of the valve cylinder 110 and the effect of the movement of the valve cylinder 110 on the path of the liquid undergoing filtering as it flows through the filter elements of A, B and C. Inasmuch as the arrangement of ports in the valve cylinder 110 and in the surrounding sleeve 40 is rather complicated, I have traced the path of flow of the liquid by dotted line in Figures 4, 5, 6 and 7. It will be understood that in these figures the filter assembly as a whole is "exploded" or diagrammatically spread out. By this method of showing any given port in the sleeve 40 is indicated both in the showing of the sleeve itself and in the exploded or spaced out showing of the individual filter units A, B and C. Where a particular port is not in operation in the position of the parts indicated, it is sometimes omitted, but in each of the diagrammatic views all the ports which are actually in use at the particular position in question are shown, one end of each port being indicated in the central figure of the diagram, the opposite end of the port being indicated in the particular assembly A, B, or C with which it cooperates.

In considering the sequence of operations, assume that my invention is employed in connection with an ordinary automobile motor of the internal combustion type. At the first position, of Figure 4, which indicates idling and lowest speed, the initial flow of oil from the engine is upwardly through the filter A. Thus the impurities are deposited on the lower side of the filter A and only initially cleaned oil passes therethrough. The sludge, when the filter A is cleaned, can be withdrawn through the outlet 65. The cleaned oil then passes downwardly through the filter B and cleans the lower surface of the filter B, the sludge being ready for removal through the sludge outlet 66. The oil, which is now passed through to filter elements then flows upwardly through the filter C and back to the return duct 135 from which it flows back to the engine to perform its lubricating duty.

As the engine accelerates the valve of the cylinder 110 is moved to the second position in which it is shown in Figure 5 and the result of the movement of the cylinder is to change the register of ports in the valve cylinder and the surrounding sleeve 40 with the following result. The oil initially flows upwardly through the already cleaned filter B, depositing whatever impurities it may have on the bottom of the filter B ready for removal through the sludge outlet 66. The cleaned oil then passes downwardly through the filter C, cleaning its lower surface of the filter C. The sludge may eventually be removed through the sludge outlet 67. The clean oil, which is already passed through two filters then flows upwardly through the filter A and back, through the outlet duct 135 to the engine.

A further acceleration of the engine moves the valve cylinder 110 to the position, which is shown in Figure 6. In this third position the oil flows upwardly through the filter C that filter having already been cleaned, thence downwardly through the filter A cleaning the lower surface of that filter and thence upwardly through the filter B and back to the engine. A further acceleration moves the valve cylinder 110 to the fourth or final position as shown in Figure 7. It will be understood that the valve may pass through the first three positions quite rapidly and the fourth position as shown in Figure 7 is the normal position during normal use of the engine and of the filter system. In the fourth or final position of Figure 7 the oil passes upwardly through the filter elements A and C, both of which have already been cleaned and the impurities are deposited on the lower surface of each of these filters and are eventually removed through the sludge outlets 65 and 67. The clean oil passes from both the filter A and the filter C to the outlet passage 135 and back to the engine.

It will be evident that at no one of the positions are impurities from the lower side of any of the filter members carried through to the engine. The sequence of positions result in an initial cleaning of the lower surface of each of the three filter elements A, B and C. At the normal fourth position the filtering area is increased by simultaneously employing two of the filter members. Considering a typical case, and a specific filter element I have used, the individual filter elements may have a diameter of two and five-sixteenths inches with a filter area for each element of approximately thirty-four square inches, a total of sixty-eight square inches of filtering area which is ample to do a thorough filtering job. It will be understood that these figures are given merely as typical or as an example as the size and shape of the filter elements, and the overall filtering area may be varied, increased or diminished to suit the need of the particular job. It will be understood for example that in general as the volume of oil flow is increased a larger area of filter element may be employed. Thus larger elements may advantageously be employed with a larger engine and smaller elements with a smaller filter area may be employed with a smaller engine. It will be understood for example that with airplane practice with a larger oil circulation a considerably larger filtering element may advantageously be employed.

I have found it advantageous to employ a filter element formed of bonded powdered or finely divided metal. Such a material however is merely one of a number of materials which could be used. One particular element which I am now using is formed of powdered bronze. Other metals may advantageously be used, although powdered bronze is in practice a very satisfactory material to use. It will also be understood that ceramic materials may advantageously be employed.

An advantageous feature of the particular elements I employ is that in connection with an extended filter surface of thin material I may employ a system of reinforcements, including the ribs 50 and 52 which result in a self supporting wear and shock resisting filter element of great strength. This, in spite of the fact that the thickness of the filter element may be as little as forty thousandths of an inch or less. It will be understood also that the fineness of the porosity of the individual filter elements may be varied through a substantial range depending upon the closeness of the filtering result required. I have available powdered metal elements the porosity of which is as fine as one ten-thousandth of an inch.

In considering my system in relation to the problem of filtering a lubricant circulated in closed circuit through an engine I obtain the result that under no circumstance does any particle of foreign material which is trapped by one of my filter elements get back into the return stream to the engine. At all four positions the oil which returns to the engine always passes through at least one of the filter elements. And under no circumstances is the cleaned off material, which is removed from any of the filter elements by a reversal of flow, returned to the engine. The cleaned material removed from the filters settles in the sumps 34 or 35 and is later removed from the sludge outlets 65, 66 or 67.

Whereas I employ pressure responsive means, such as the bellows 85 opposed to the spring 99 for controlling the position and changing the position of the valve 110 it will be understood that I may employ any other suitable means for varying the valve position and thus the direction of flow of the liquid through the filter elements. However, it is advantageous, in an engine filtering cycle to use variations in pressure or flow of the lubricant to operate the valve controlling means. It will be understood that any suitable timing means may be employed for intermediately changing the position of the valve 110 and thus causing changes in the direction or order of flow of the liquid through the individual filter elements, to clean them of accumulated material.

I claim:

1. In combination, for use in a fluid circuit passage system, filter housing means having a plurality of individual filter elements therein, said system including a delivery passage extending to said housing means and a return passage extending from said housing means, and means for varying the direction of flow of the fluid through individual filter elements, and for thereby cleaning sludge therefrom, while maintaining a flow of fluid into said delivery passage, through said housing means, and outwardly through said return passage, said means for varying the direction of fluid flow including fluid-operated valve means for connecting one of said filter elements at all times in filtering relation between the sludge discharge side of any element or elements undergoing cleaning, and said return passage.

2. In combination, a filter housing means defining a plurality of filter chambers, a fluid pervious filter element in each said filter chamber, a valve cylinder associated with said housing, the interior of said valve cylinder being adapted for communication with the interior of said housing, and being formed unitarily with said housing, a fluid inlet passage extending into said cylinder, a fluid outlet passage extending from said cylinder, said cylinder having a plurality of ports adapted to communicate with said filter chambers, a piston valve in said valve cylinder axially movable along said cylinder, said piston valve having passages alternately alignable with said ports, and adapted, in response to movement of the piston and to the change in alignment thereby effected, to vary the order of flow of fluid through said filter chambers, and means for moving the piston valve.

3. In combination, a filter housing means defining a plurality of separate filter chambers, a fluid pervious filter element in each of said chambers, a control chamber, a fluid inlet duct, for said housing means, extending into said control chamber, a fluid return duct, for said housing means, extending from said control chamber, said control chamber having a plurality of ports adapted to open communication between the interior of said control chamber and the interior of said filter chambers selectively at opposite sides of the filter element in each of said filter chambers, valve means movably positioned in said control chamber, having passages adapted to register with said ports, and means for moving said valve means and for thereby opening and closing communication between the interior of said control chamber and said individual filter chambers.

4. In a filter assembly, a filter housing means defining a plurality of filter chambers, a fluid pervious filter element in each of said filter chambers, a valve cylinder associated with said housing, the interior of said valve cylinder being adapted for communication with the interior of said housing, and being formed unitarily with said housing, a fluid inlet passage extending into said cylinder, a fluid outlet passage extending from said cylinder, said cylinder having a plurality of ports adapted to communicate with said filter chambers, there being ports between each of said chambers and said valve cylinder opening to opposite sides of the fluid pervious filter elements in each of said chambers, a piston valve in said valve cylinder, having passages adapted to register with said ports in varying relationship, depending upon the position of the piston, and means for moving said piston and for thereby varying the direction of flow of fluid through said filter chambers.

5. The structure of claim 4 characterized by the provision of a sludge outlet generally vertically aligned beneath each filter chamber.

6. The structure of claim 4 characterized by the provision of a sludge outlet generally vertically aligned beneath each filter chamber and a unitary closure for said sludge outlets.

7. The structure of claim 4 characterized by the employment of a housing including an upper section and a lower section and means for securing them together, each section being adapted to form a part of each of said filter chambers.

8. The structure of claim 4 characterized by the employment of a housing including an upper section and a lower section curing them together, each section being adapted to form part of each of said filter chambers and unitary gasket means between said sections, including a funnel portion in each said chamber located below the filter element of said chamber.

9. The structure of claim 1 characterized by the employment of a filter housing including a plurality of separate filter chambers with an individual filter element in each of said chambers, and a control cylinder ported for communication with each of said filter chambers, and said valve means including a valve element in said cylinder and means for moving it in response to changes in pressure in the lubricant circulating system and for thereby controlling the order and varying the direction of flow of oil through the individual filter elements.

10. In a filter assembly, a housing defining a plurality of separate filter chambers arranged about a center and a control cylinder forming the center about which said chambers are arranged, individual filter elements in each of said chambers, a sludge outlet from each of said chambers, and closure means therefor, said control cylinder being ported for communication with each of said chambers selectively on opposite sides of the filter elements of each chamber, a valve member in said cylinder having passages adapted, in response to movement of the valve member, to vary the consecutive order and direction of flow through said chambers, and filter elements, a fluid inlet duct for said control cylinder, a fluid outlet duct from said control cylinder and means, responsive to variations in the pressure of the fluid entering the cylinder through said inlet duct, for varying the position of said valve, and for thereby altering the consecutive order and direction of flow of fluid through said chambers and filter elements.

11. In a filter structure adapted for use in filter circuits in which a fluid to be filtered is unidirectionally circulated, a filter housing having walls defining a plurality of separate filter chambers and a control chamber, a piston valve movable along said control chamber, a filter member in each of said filter chambers, the filter housing walls about said control chamber having ports extending between said control chamber and each of said filter chambers, and opening to opposite sides of the filter member of each filter chamber, a fluid inlet to said filter housing, a fluid outlet from said filter housing, said piston valve having ducts formed and adapted to communicate with said ports, said ducts and ports being in the line of flow between said fluid inlet and said fluid outlet, the ports extending to the individual filter chambers being formed and arranged, in relation to the piston ducts, to effect a reversal of flow of the fluid through individual filter elements in response to predetermined changes in position of the piston in the control chamber, without loss from the circuit of the fluid being filtered.

12. In a filter structure adapted for use in filter circuits in which a fluid to be filtered is unidirectionally circulated, a filter housing having walls defining a plurality of separate filter chambers and a control chamber, a piston valve movable along said control chamber, a filter member in each of said filter chambers, the filter housing walls about said control chamber having ports extending between said control chamber and each of said filter chambers, and opening to opposite sides of the filter member of each filter chamber, a fluid inlet to said filter housing, a fluid outlet from said filter housing, said piston valve having ducts formed and adapted to communicate with said ports, said ducts and ports being in the line of flow between said fluid inlet and said fluid outlet, the ports extending to the individual filter chambers being formed and arranged, in relation to the piston valve ducts, to effect a change in consecutive order and reversal of flow of the fluid through individual filter elements in response to predetermined changes in position of the piston valve in the control chamber, without loss from the circuit of the fluid being filtered, and means, responsive to variations in the pressure of the fluid being filtered, for moving said piston valve, and for thereby varying the direction and consecutive order of flow through the filter elements.

13. In a filter structure adapted for use in filter circuits in which a fluid to be filtered is unidirectionally circulated, a filter assembly having walls defining a plurality of separate filter chambers and a control chamber, a piston valve movable along said control chamber, an individual filter member in each of said filter chambers, extending entirely across the chamber, and dividing the chamber into two parts, the filter assembly walls about said control chamber having ports extending between said control chamber and each of said filter chambers on opposite sides of the filter member of each filter chamber, a fluid inlet to said filter assembly, a fluid outlet from said filter assembly, said piston valve having ducts formed and adapted to communicate with said ports, said ducts and ports being in the line of flow between said fluid inlet and said fluid outlet the ports extending to the individual filter chambers being formed and arranged, in relation to the piston valve ducts, to effect a change in the direction and consecutive order of flow of fluid through a plurality of individual filter elements, in response to predetermined changes in position of the piston valve in the control chamber, without loss from the circuit of the fluid being filtered.

FREDERICK W. STRASSHEIM.

REFERENCES CITED

The following references are of record in the file of this patent:

UNITED STATES PATENTS

| Number | Name | Date |
|---|---|---|
| 218,351 | Weed | Aug. 5, 1879 |
| 582,399 | Stifel | May 11, 1897 |
| 1,646,513 | Winton | Oct. 25, 1927 |
| 1,737,313 | Kamrath | Nov. 26, 1929 |
| 1,883,805 | Martin et al. | Oct. 18, 1932 |
| 1,989,795 | Fellows | Feb. 5, 1935 |
| 2,023,423 | Kleckner | Dec. 10, 1935 |
| 2,159,196 | Babitch | May 23, 1939 |
| 2,173,060 | Andrews | Sept. 12, 1939 |
| 2,333,609 | Widmann | Nov. 2, 1943 |
| 2,429,417 | Magill | Oct. 21, 1947 |

FOREIGN PATENTS

| Number | Country | Date |
|---|---|---|
| 511,891 | Great Britain | Aug. 25, 1939 |
| 699,915 | Germany | Dec. 11, 1940 |